United States Patent [19]
Fitzgerald

[11] Patent Number: 6,047,796
[45] Date of Patent: Apr. 11, 2000

[54] DUST COVER PROVIDING DESIRED VEHICLE WHEEL APPEARANCE

[76] Inventor: Randall Fitzgerald, 115 Mauldon Ct., Warner Robins, Ga. 31093

[21] Appl. No.: 09/017,873

[22] Filed: Feb. 3, 1998

[51] Int. Cl.⁷ .................................................... F16D 65/10
[52] U.S. Cl. ......................................................... 188/218 A
[58] Field of Search .......................... 188/218 A, 18 A; 301/6.3, 6.91, 37.1

[56] References Cited

U.S. PATENT DOCUMENTS

| | | | |
|---|---|---|---|
| 4,005,768 | 2/1977 | Bubnash et al. | |
| 4,257,498 | 3/1981 | Nogami | 188/218 A |
| 4,484,667 | 11/1984 | Bottieri, Jr. | 188/218 A |
| 4,550,809 | 11/1985 | Kawaguchi | 188/18 A |
| 4,844,551 | 7/1989 | Hempelmann | 307/37 SS |
| 5,279,396 | 1/1994 | Estaque et al. | |
| 5,293,967 | 3/1994 | Siegrist | 188/264 R |

FOREIGN PATENT DOCUMENTS 2 276 216  9/1994  United Kingdom ............... 188/218 A

*Primary Examiner*—Paul N. Dickson
*Assistant Examiner*—Jeffrey Woller
*Attorney, Agent, or Firm*—Evenson, McKeown, Edwards & Lenahan, P.L.L.C.

[57] ABSTRACT

A dust cover for placement between a vehicle wheel and a vehicle hub includes an outer perimeter, a central protrusion defining an opening for receiving a spindle of the vehicle hub and a plurality of lug openings, and a concave intermediate portion extending radially between the central protrusion and the perimeter. The intermediate portion has an outboard side surface configured to engage inboard sides of wheel spokes when the dust cover is mounted between the wheel and the hub of the vehicle. Fins are preferably defined on an inboard side surface of the intermediate portion. At least part of the outboard side surface is colored to provide a desired appearance between the wheel spokes at an outboard side of the wheel.

20 Claims, 2 Drawing Sheets

DUST COVER PROVIDING DESIRED VEHICLE WHEEL APPEARANCE

BACKGROUND OF THE INVENTION

1. Field of the Invention

This invention concerns a dust cover which helps prevent transmission of dirt, dust and so on through openings defined between wheel spokes. A unique appearance, which is not affected by dust generated by vehicle braking, is provided by the dust cover.

2. Description of Related Art

U.S. Pat. No. 4,484,667 to Bottieri, Jr. discloses a shield plate clamped between a wheel spider and a brake rotor for preventing dust produced during braking from being deposited on a visible portion of the wheel. The Bottieri, Jr. patent describes the shield plate as including an inner conical segment, which is inclined outwardly at an angle of about 60° to a wheel axis, a flat, annular, intermediate segment extending radially outwardly from the inner conical segment, and an outer conical segment having an inclination which is opposite to that of the inner conical segment. This configuration provides a clearance for the projecting end of a brake caliper.

SUMMARY OF THE INVENTION

It is a primary object of this invention to provide an improved dust cover which helps prevent transmission of dirt, dust and so on from both an outboard or exterior side of a wheel to an inboard or interior side thereof and the inboard side of the wheel to the outboard side thereof. A unique and colorful appearance, which is not affected by dust generated during vehicle braking and is visible between spokes of the wheel, is provided by the dust cover. The dust cover, in its preferred configuration, also promotes cooling of a vehicle brake associated therewith.

The dust cover is designed for placement between a vehicle wheel and a vehicle hub and includes an outer perimeter, a central protrusion defining an opening for receiving a spindle of the vehicle hub and having a plurality of lug openings, and a concave intermediate portion. The intermediate portion extends radially between the central protrusion and the perimeter and has an outboard side surface. This outboard side surface is configured to engage inboard sides of wheel spokes when the dust cover is mounted between the wheel and the hub of the vehicle. Fins are preferably defined on an inboard side surface of the intermediate portion to produce air flow for dust deflection and brake cooling. At least part of the outboard side surface is colored to provide a desired appearance between the wheel spokes at an outboard side of the wheel.

DESCRIPTION OF THE PREFERRED EMBODIMENT

Figure 1:
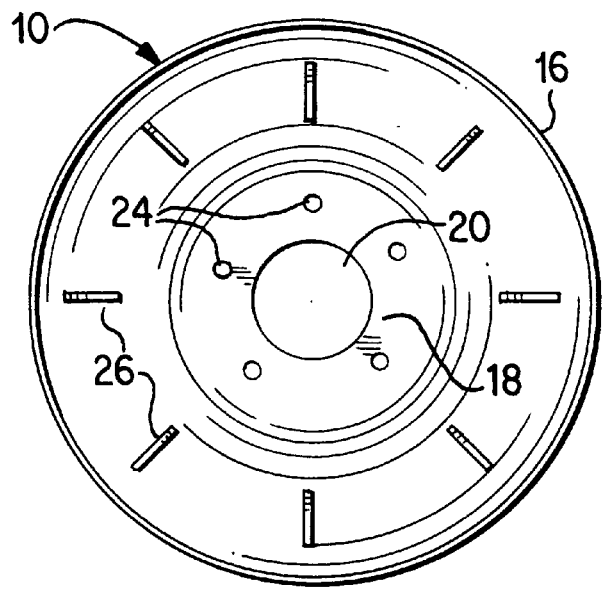
FIG. 1 is a view of a side surface of the dust cover which, when the dust cover is in use, forms an inboard side surface.
Figure 2:
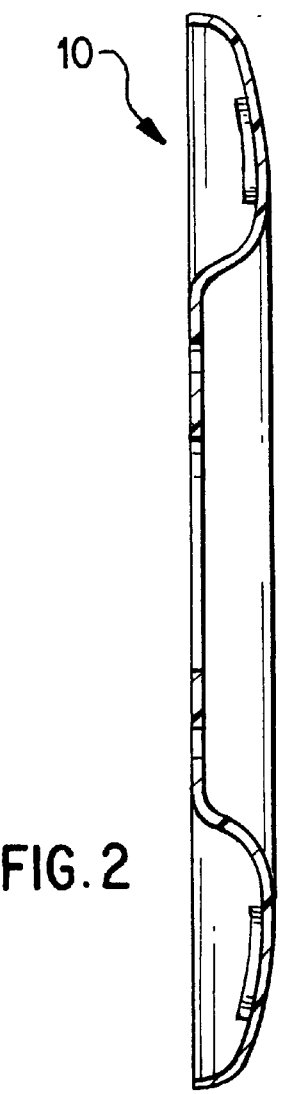
FIG. 2 is a side sectional view of the dust cover illustrated in FIG. 1.
Figure 3:
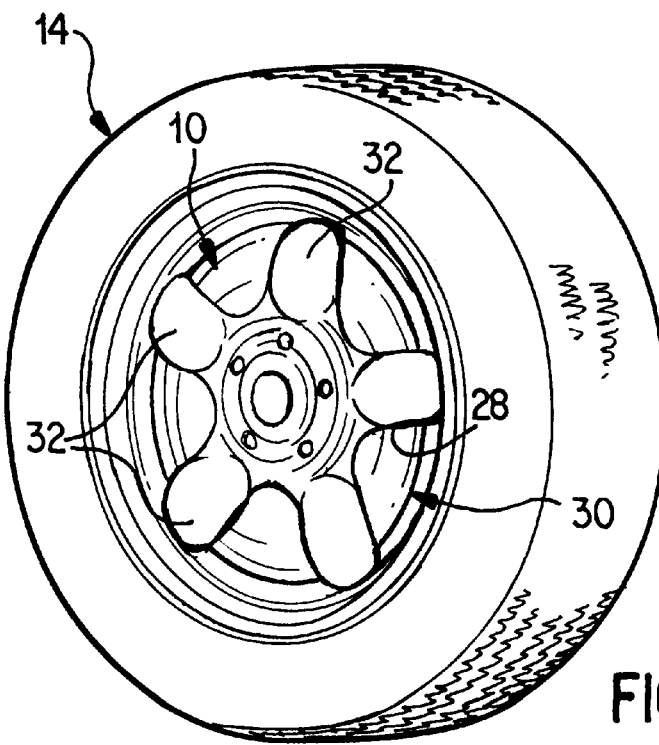
FIG. 3 is a perspective view of an outboard side of a wheel to which the dust cover has been mounted and showing visible portions of the outboard side surface of the dust cover.
Figure 4:
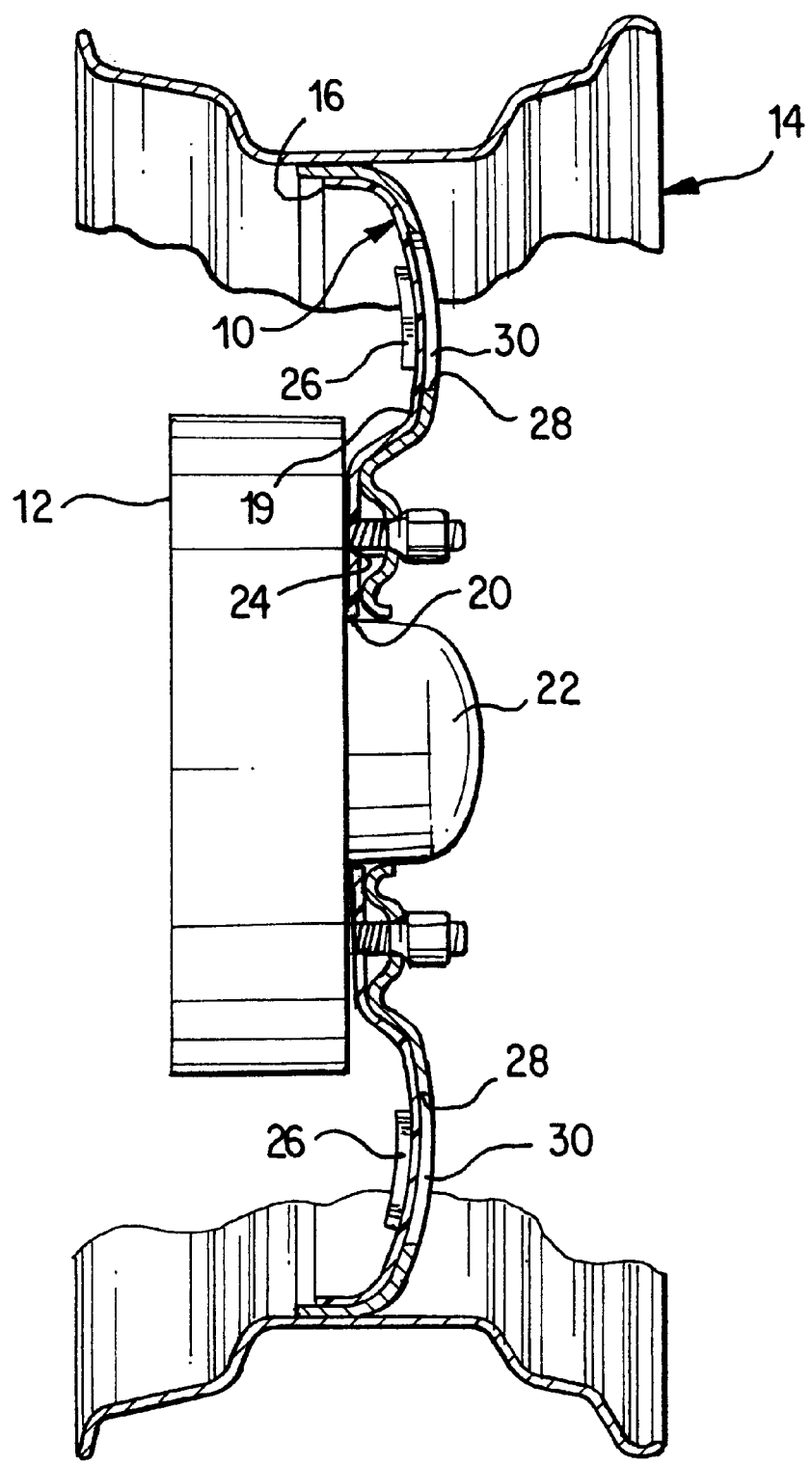
FIG. 4 is a sectional view of the wheel shown in FIG. 3.

The dust cover 10 shown in FIGS. 1 through 4 is placed on a hub 12 inside a vehicle wheel 14. The dust cover 10 is circular and includes a circular outer perimeter 16, a concentric annular central protrusion 18 and a central opening 20 at the center of the protrusion 18. The central opening 20 is designed to be mounted on the spindle 22 of the hub 12. Lug openings 24 are arranged in a circumferential array about the central opening 20.

Fins 26 are arranged in a concave intermediate portion 19 disposed between the central portion 18 and the perimeter 16. The fins 26 are arranged in a concentric array about the protrusion 18, on the inboard surface of the dust cover, and function to create air movement when the dust cover rotates. As illustrated, the dust cover 10 includes eight such fins. The fins, as shown, extend radially of the dust cover 10. The air movement or flow produced by the fins 26 assists in cooling the vehicle brakes during brake operation and deflects dust away from the outboard or visible side of the wheel 14 so that it does not collect on the outboard side of the wheel.

When the dust cover is mounted to the vehicle, it is placed between the hub 12 and the wheel 14. The central opening 20 of the dust cover receives the spindle 22. The lug openings 24 are aligned with the lugs of the hub 12 so that the lugs pass through the openings 24. The wheel then is mounted in the usual manner on the hub, over the dust cover, and secured in place by nuts screwed onto the lugs.

The shape of the dust cover 10 is significant in that it is formed so that the intermediate portion 19 of the dust cover engages the inside or inboard surfaces of the spokes 32 of the wheel. The outboard side of the dust cover contacts the edges 28 of the openings 30 of the wheel between the spokes. This places the dust cover in the immediate vicinity of the spaces 30. No clearance is left between the inboard surfaces of the spokes 32 and the outboard surface of the dust cover 10. As a result of this configuration, dirt, dust, etc., cannot pass through the openings 30 from outside the vehicle. Dust from brake wear also cannot pass through the openings from the inside to the outside of the wheel. Moreover, the appearance of the combination is enhanced in that the color of the dust cover 10 is placed in the immediate vicinity of the openings 30 so as to provide an observer with a unique and colorful appearance. Because brake dust is unable to collect on the outboard side of the wheel, it will not detract from this appearance. Any of a variety of colors (such as red, black, and so on) can be selected by a purchaser. The outboard side surface of the intermediate portion 19 may be painted an appropriate color. Alternatively, the entire dust cover may be painted or cast or molded from a material of an appropriate color. Aluminum, an aluminum alloy, and heat resistant plastic are examples of appropriate dust cover materials. Balancing of dust covers may be required.

The dust cover is mounted between the wheel and the hub of an automobile in order to enhance the appearance of the outer side of the wheel. Dust generated during vehicle braking is deflected from the vicinity of the wheel and does not collect on the wheel. As a result, a pleasing colorful appearance in the spaces between the radial spokes of the wheel is provided and is not obscured.

The particular embodiment described is only an example and is not to be considered the only embodiment encompassed by the following claims.

What is claimed is:

1. A dust cover for placement between a vehicle wheel and a vehicle hub comprising:
   an outer perimeter,
   a central protrusion defining an opening for receiving a spindle of the vehicle hub and a plurality of lug openings, a concave intermediate portion extending radially between said central protrusion and said perimeter and having an outboard side surface configured to engage inboard sides of wheel spokes when the dust cover is mounted between the wheel and the hub of the vehicle so that no clearance is left between the inboard sides of the wheel spokes and the outboard side surface of said dust cover in an immediate vicinity of openings between the wheel spokes.

2. A dust cover for placement between a vehicle wheel and a vehicle hub comprising:

an outer perimeter, a central protrusion defining an opening for receiving a spindle of the vehicle hub and a plurality of lug openings, a concave intermediate portion extending radially between said central protrusion and said perimeter and having an outboard side surface configured to engage inboard sides of wheel spokes when the dust cover is mounted between the wheel and the hub of the vehicle, and fins defined on an inboard side surface of said intermediate portion.

3. The dust cover of claim 2, wherein the fins extend radially of said dust cover.

4. The dust cover of claim 2, wherein the fins are designed to create air movement when the dust cover rotates to promote cooling of vehicle brakes.

5. The dust cover of claim 2, wherein the fins are designed to create air movement when the dust cover rotates to deflect dust away from an outboard side of the vehicle wheel.

6. The dust cover of claim 1, wherein at least part of said outboard side surface is colored to provide a desired appearance between the wheel spokes at an outboard side of the wheel.

7. The dust cover of claim 2, wherein at least part of said outboard side surface is colored to provide a desired appearance between the wheel spokes at an outboard side of the wheel.

8. The dust cover of claim 3, wherein at least part of said outboard side surface is colored to provide a desired appearance between the wheel spokes at an outboard side of the wheel.

9. The dust cover of claim 4, wherein at least part of said outboard side surface is colored to provide a desired appearance between the wheel spokes at an outboard side of the wheel.

10. The dust cover of claim 5, wherein at least part of said outboard side surface is colored to provide a desired appearance between the wheel spokes at an outboard side of the wheel.

11. A method of providing a desired appearance to a vehicle wheel comprising the steps of:

providing a dust cover with a desired color over at least part of at least one surface thereof; and securing the dust cover between a hub of the vehicle and the vehicle wheel so that said one surface engages inboard surfaces of spokes of the wheel with no clearance left between the inboard surfaces of the spokes and the one surface of said dust cover in an immediate vicinity of openings between the spokes.

12. The method of claim 11, and further comprising the step of creating air movement when the dust cover rotates which deflects dust away from said one surface.

13. The method of claim 11, wherein said one surface is an outboard surface of the dust cover.

14. The method of claim 13, wherein the part of said one surface is visible through openings between the spokes of the wheel.

15. A dust cover for placement between a vehicle wheel and a vehicle hub to deflect dust and provide a desired vehicle wheel appearance comprising:

an outer perimeter, a central portion which is clamped between the vehicle wheel and the vehicle hub, a concave intermediate portion extending radially between said central position and said perimeter, having an outboard side surface configured to engage inboard sides of wheel spokes when the dust cover is mounted between the wheel and the hub of the vehicle, and including elements defined on an inboard side surface thereof which generate air movement when the dust cover rotates.

16. The dust cover of claim 15, wherein said elements are fins defined on an inboard side surface of said intermediate portion.

17. The dust cover of claim 16, wherein the fins extend radially of said dust cover.

18. The dust cover of claim 15, wherein at least part of said outboard side surface is colored to provide a desired appearance between the wheel spokes at an outboard side of the wheel.

19. The dust cover of claim 16, wherein at least part of said outboard side surface is colored to provide a desired appearance between the wheel spokes at an outboard side of the wheel.

20. The dust cover of claim 17, wherein at least part of said outboard side surface is colored to provide a desired appearance between the wheel spokes at an outboard side of the wheel.

* * * * *